(12) United States Patent
Okazawa

(10) Patent No.: US 8,823,985 B2
(45) Date of Patent: Sep. 2, 2014

(54) WIRELESS COMMUNICATION SETTING CONTROL APPARATUS, AND CONTROL METHOD AND STORAGE MEDIUM THEREFOR

(75) Inventor: Takashi Okazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 13/586,941

(22) Filed: Aug. 16, 2012

(65) Prior Publication Data

US 2013/0057905 A1    Mar. 7, 2013

(30) Foreign Application Priority Data

Sep. 2, 2011  (JP) .................................. 2011-191614

(51) Int. Cl.
*G06F 3/12* (2006.01)
*H04W 24/02* (2009.01)
*H04W 8/22* (2009.01)

(52) U.S. Cl.
CPC ................ *H04W 24/02* (2013.01); *H04W 8/22* (2013.01)
USPC ........................................................ 358/1.15

(58) Field of Classification Search
CPC ......................................................... G06F 3/12
USPC ........................................................ 358/1.15
See application file for complete search history.

(56) References Cited

FOREIGN PATENT DOCUMENTS

JP      2007-074556 A     3/2007

OTHER PUBLICATIONS

Machine translation for JP 2007-074556, IDS.*

* cited by examiner

*Primary Examiner* — Qian Yang
(74) *Attorney, Agent, or Firm* — Rossi, Kimms & McDowell LLP

(57) ABSTRACT

A control apparatus that controls a wireless communication setting in an information processing apparatus such that the setting can easily be set, without the provision of an additional device in the information processing apparatus. A PC as a control apparatus is USB connected to a printer as an information processing apparatus having a wireless communication function, and controls the setting of wireless communication between a wireless access point and the printer. The printer and the wireless access point are instructed via a USB interface and via a wired LAN by the PC to start the setting of wireless communication. When receiving from each of the printer and the wireless access point a setting result notification that represents a result of execution of the setting of wireless communication, the PC causes a display unit thereof to display the setting result notifications.

8 Claims, 5 Drawing Sheets

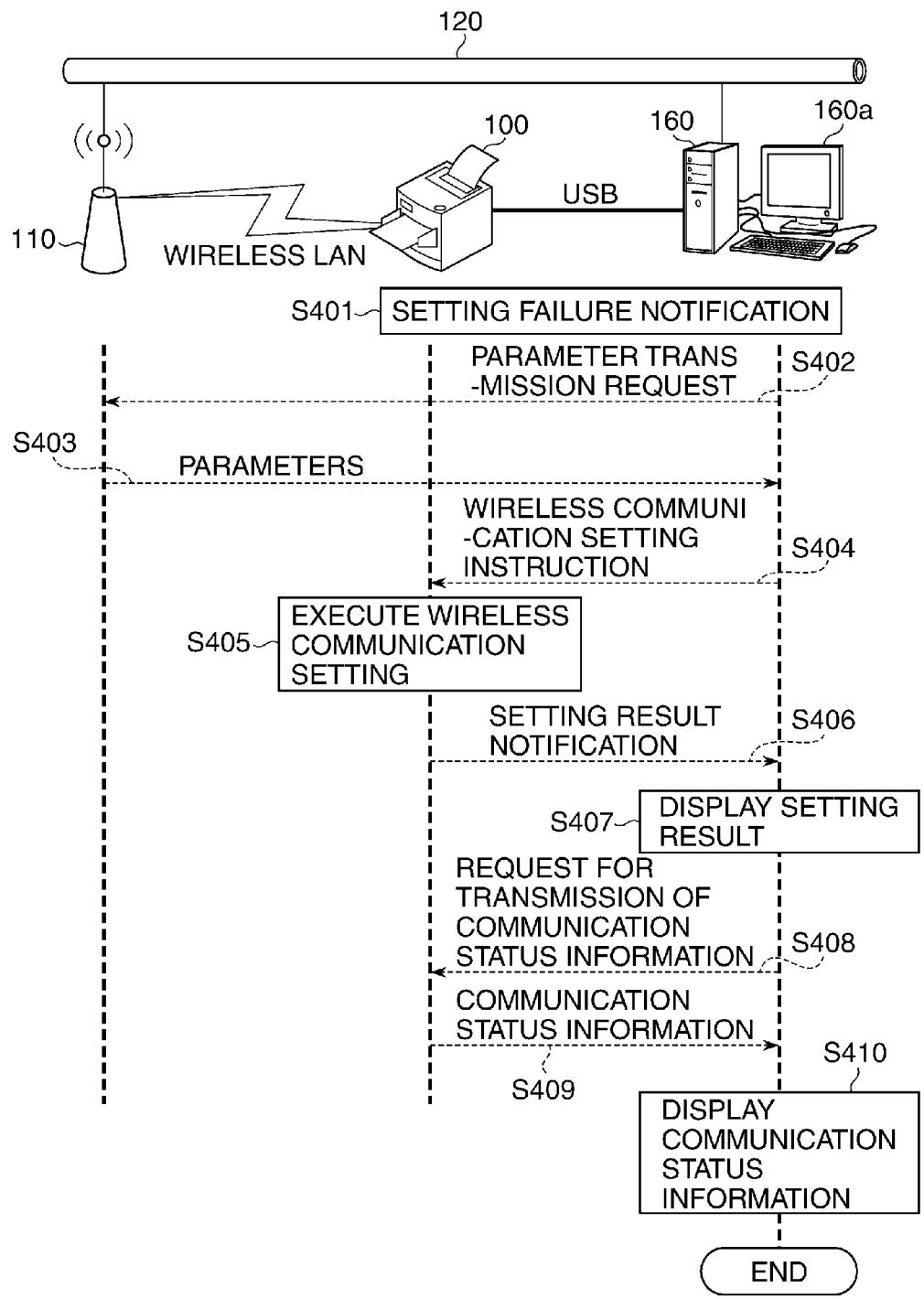

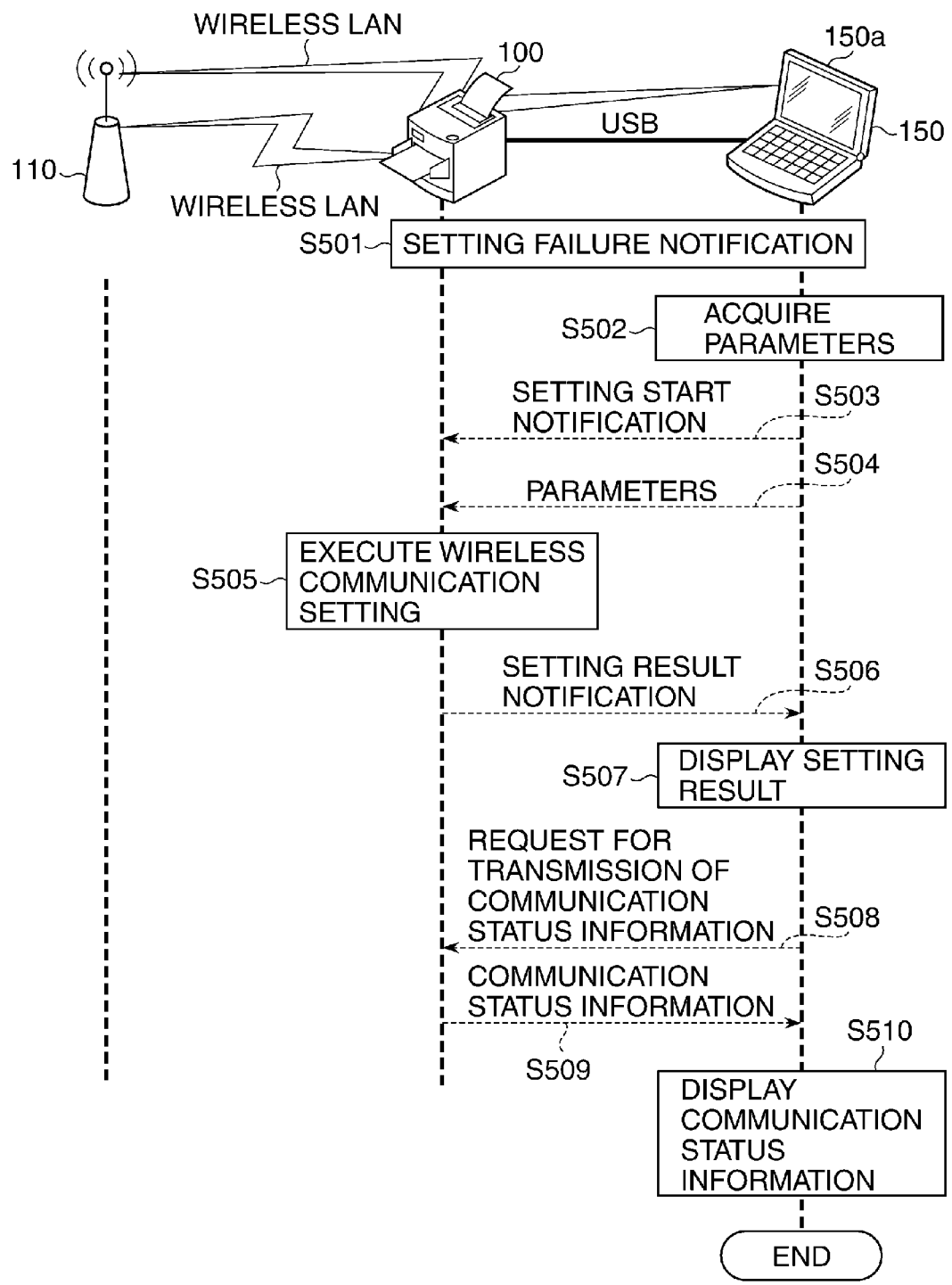

WIRELESS COMMUNICATION SETTING CONTROL APPARATUS, AND CONTROL METHOD AND STORAGE MEDIUM THEREFOR

BACKGROUND OF THE INVENTION

1. Field of the Invention

The present invention relates to a control apparatus that controls wireless communication setting in an information processing apparatus such as an image forming apparatus, and relates to a control method and a storage medium for the control apparatus.

2. Description of the Related Art

To enable an information processing apparatus such as an image forming apparatus to perform wireless communication with an external device, a wireless communication setting must generally be set in advance. In the case, for example, of an image forming apparatus, the wireless communication setting is set by a user by using an input panel provided in the image forming apparatus. It is however difficult for a general user to set the wireless communication setting since a number of setting items and options are involved in the setting and difficult terms are used therein.

Accordingly, an easy setting function called AOSS (AirStation One-Touch Secure System) has been developed by Buffalo Inc. that makes it easy for even a general user to make a setting of wireless communication e.g. between an information processing apparatus and a wireless access point. Also, a standard called WPS (Wi-Fi Protected Setup) has been created by the Wi-Fi Alliance, which is a trade association of companies that produce wireless LAN products.

When a communication terminal apparatus such as a digital still camera is newly connected to a wireless communication environment, a user must set a communication setting for the communication terminal apparatus, which is laborsome. Thus, there has been known a communication terminal apparatus which has a wireless communication function and a wired communication function and in which wireless communication setting information set in a computer such as a PC is acquired therefrom by using the wired communication function and wireless communication is performed by the wireless communication function by using the acquired wireless communication setting information (see, Japanese Laid-open Patent Publication No. 2007-74556).

As described above, there have been proposed a variety of wireless communication setting techniques. Among these, the technique for making a wireless communication setting by using the AOSS function or by using the WPS function requires that a button input device must be provided in an information processing apparatus, which increases costs. In addition, the user is required to conduct a setting operation at a location near the information processing apparatus and near a wireless access point.

Also, in a case that a wireless communication setting is set by inputting a WPS PIN (personal identification number) code into an information processing apparatus, a panel input device for inputting the PIN code must be provided in the information processing apparatus, which increases costs. In addition, there is a fear that there occurs a mistake when the PIN code is input.

At any rate, conventional information processing apparatuses have a problem that a user must perform troublesome wireless communication setting and that these apparatuses become high-priced, if they require an additional device such as an input device for wireless communication setting. This is disadvantageous especially in e.g. an image forming apparatus, which must be low-priced.

SUMMARY OF THE INVENTION

The present invention provides a control apparatus that controls a wireless communication setting in an information processing apparatus such that the setting can easily be set without the provision of an additional device in the information processing apparatus, and provides a control method and a storage medium for the control apparatus.

According to one aspect of this invention, there is provided a control apparatus that is connected via a wired network to an information processing apparatus having a wireless communication function and that controls a setting of wireless communication between a wireless access point and the information processing apparatus, which comprises display unit, a setting control unit configured to instruct the information processing apparatus via the wired network to start the setting of wireless communication and instruct the wireless access point via a network to start the setting of wireless communication, and a display control unit configured, when receiving a setting result notification that represents a result of execution of the setting of wireless communication between the information processing apparatus and the wireless access point, to cause the display unit to display the setting result notification.

With this invention, a wireless communication setting in an information processing apparatus such as an image forming apparatus can easily be set, and the information processing apparatus does not require an additional device and can be prevented from becoming high-priced.

Further features of the present invention will become apparent from the following description of an exemplary embodiment with reference to the attached drawings.

BRIEF DESCRIPTION OF THE DRAWINGS

FIG. 4 is a view showing procedures of a recovery process performed by the PC upon occurrence of an error during execution of the wireless communication setting control of FIG. 2; and FIG. 5 is a view showing procedures of a recovery process performed by another PC, which is different from the PC that performs the process of FIG. 4, upon occurrence of an error during execution of wireless communication setting control similar to that of FIG. 2.

DESCRIPTION OF THE EMBODIMENTS

The present invention will now be described in detail below with reference to the drawings showing a preferred embodiment thereof.

Figure 1:
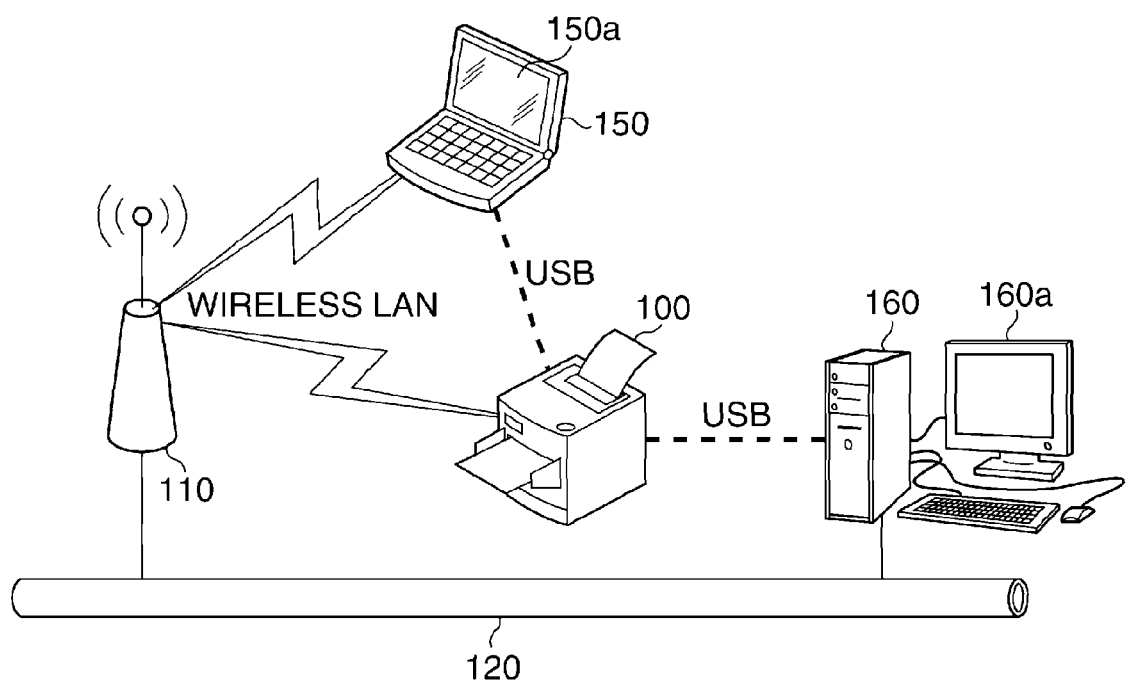
FIG. 1 is a schematic view showing a wireless LAN system that includes PCs which are each an example of a wireless communication setting control apparatus according to one embodiment of this invention and an image forming apparatus which is an example of an information processing apparatus.

FIG. 1 shows a wireless LAN system that includes computers (e.g. PCs) which are each an example of a wireless communication setting control apparatus according to one embodiment of this invention and an image forming apparatus (e.g. a printer) which is an example of an information processing apparatus.

In FIG. 1, reference numeral 100 denotes a printer whose wireless communication setting (wireless LAN communication setting in this example) is set as will be described later under the control of a PC 150 or 160, and reference numeral 110 denotes a wireless access point (hereinafter referred to as the AP) that is connected to a network, e.g., a wired LAN 120.

The printer 100 has a wireless network interface via which the printer is capable of performing wireless communication with the AP 110, and has local interfaces (e.g. USB interfaces) that can be wire-connected to local interfaces of the PCs 150, 160, respectively.

When the printer 100 is wire-connected to the PC 150 or 160 via the local interfaces, bi-directional communication can be performed between the PC 150 or 160 and the printer 100 while using a communication protocol for the local interfaces, whereby for example print data and a printing instruction are transmitted from the PC 150 or 160 to the printer 100, the print data is printed by the printer 100, and printer status information is notified from the printer 100 to the PC 150 or 160.

The PC 150 has a display unit 150a and a wireless network interface via which the PC 150 is capable of performing wireless communication with the AP 110. The PC 160 has a display unit 160a and a network interface that is connected to the wired LAN 120.

For the communication via the network interfaces, a communication protocol such as TCP/IP (Transmission Control Protocol/Internet Protocol) is used.

The printer 100 has a typical wireless communication setting function such as AOSS or WPS by which a wireless communication setting is carried out as will be described later.

To this end, e.g., logical channels for printer control are provided in respective ones of the local interface and the wireless network interface of the printer 100. A communication protocol for printer setting control is used for transmission to the logical channels for printer control and for transmission to a designated UDP (User Datagram Protocol) port number of the wireless network interface.

It should be noted that the wireless communication setting function can be provided in a WEB service, which is implemented by HTTP (HyperText Transfer Protocol) of TCP/IP, whereby wireless communication setting control can be performed while ensuring security by using SSL (Secure Socket Layer) and Java (registered trademark) script or the like.

Figure 2:
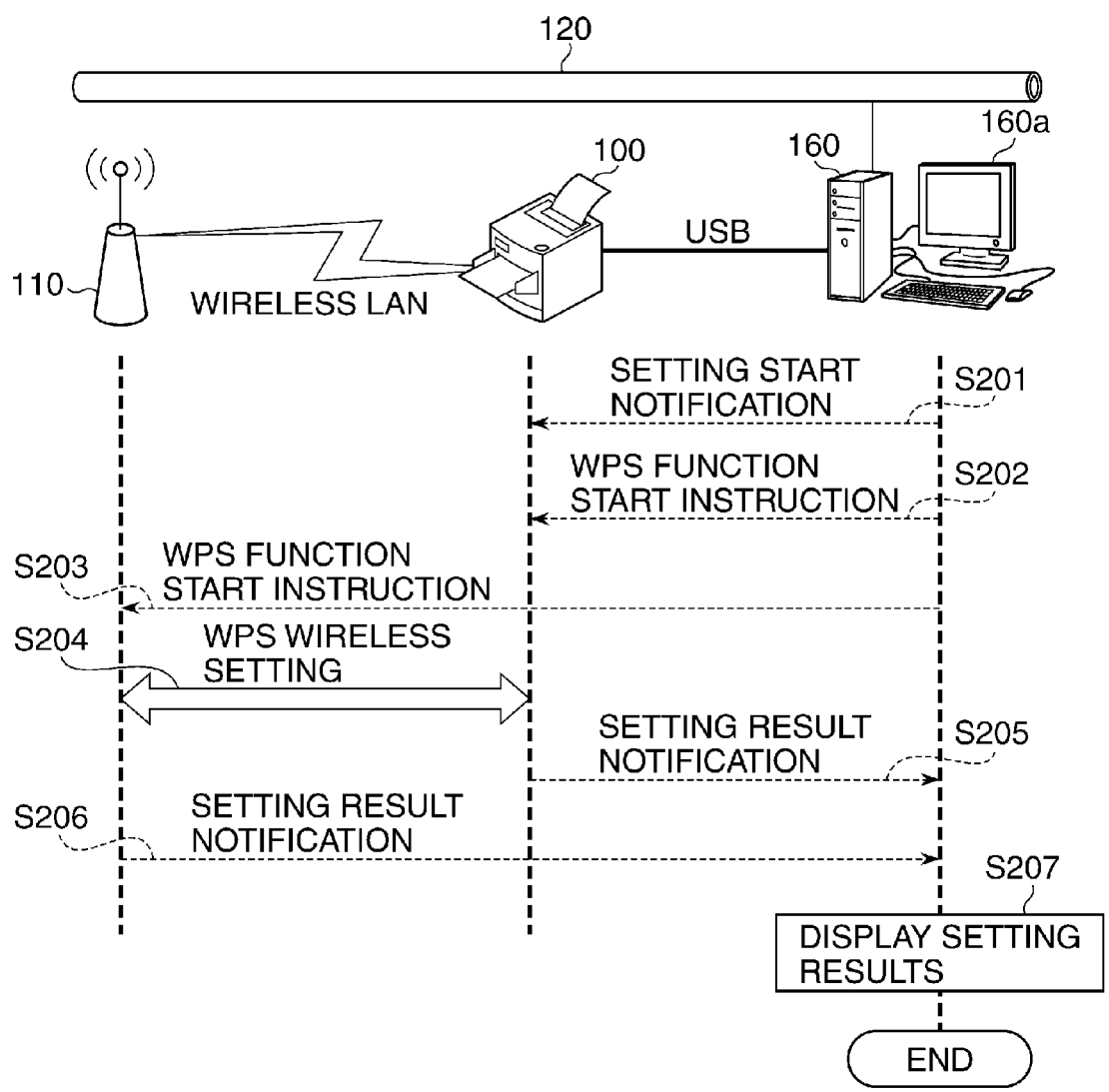
FIG. 2 is a view showing a first example of procedures of wireless communication setting control performed by one of the PCs in the wireless LAN system.

FIG. 2 shows a first example of procedures of wireless communication setting control in the wireless LAN system of FIG. 1. In this example, a case will be described where the PC 160 controls wireless communication setting in which the WPS function is used as the wireless communication setting function. As previously described, the PC 160 is connected to the wired LAN 120 and connected via the USB interfaces to the printer 100.

The wireless communication setting control of FIG. 2 is started when a predetermined application program for wireless communication setting is designated by a user on a user interface, which is displayed on the display unit 160a by an operating system such as a Windows (registered trademark) OS running on the PC 160, and started by the PC 160.

In the wireless communication setting control, the PC 160 (setting control unit) sends a notification to start the wireless communication setting to the printer 100 via the USB interface (step S201), and instructs the printer 100 via the USB interface to start the WPS function (step S202). Next, the PC 160 instructs the AP 110 via the wired LAN 120 to start the WPS function (step S203).

In this example, the PC 160 gives the instructions to start the WPS function in steps S202 and S203 in accordance with a user's instruction. However, if the user designates the AOSS function or both the WPS and AOSS functions as the wireless communication setting function, the PC gives instructions to start the AOSS function or both the WPS and AOSS functions in steps S202 and S203.

In response to the WPS function start instructions given in steps S202 and S203, the AP 110 and the printer 100 start executing the wireless communication setting by the WPS function, which will be referred to as the WPS wireless setting (step S204). It should be noted that processing for the WPS wireless setting between the AP 110 and the printer 100 is the same as that for ordinary WPS setting, and therefore a description thereof is omitted herein.

After executing the WPS wireless setting, the printer 100 sends to the PC 160 a setting result notification that represents a result of the execution of the WPS wireless setting (step S205). Similarly, after executing the WPS wireless setting, the AP 110 sends to the PC 160 a setting result notification that represents a result of the execution of the WPS wireless setting (step S206). The PC 160 (display control unit) causes the display unit 160a to display the results of the execution of the WPS wireless setting (wireless communication setting), which are respectively notified from the printer 100 and the AP 110 (step S207), whereupon the wireless communication setting control of FIG. 2 is completed.

Figure 3:
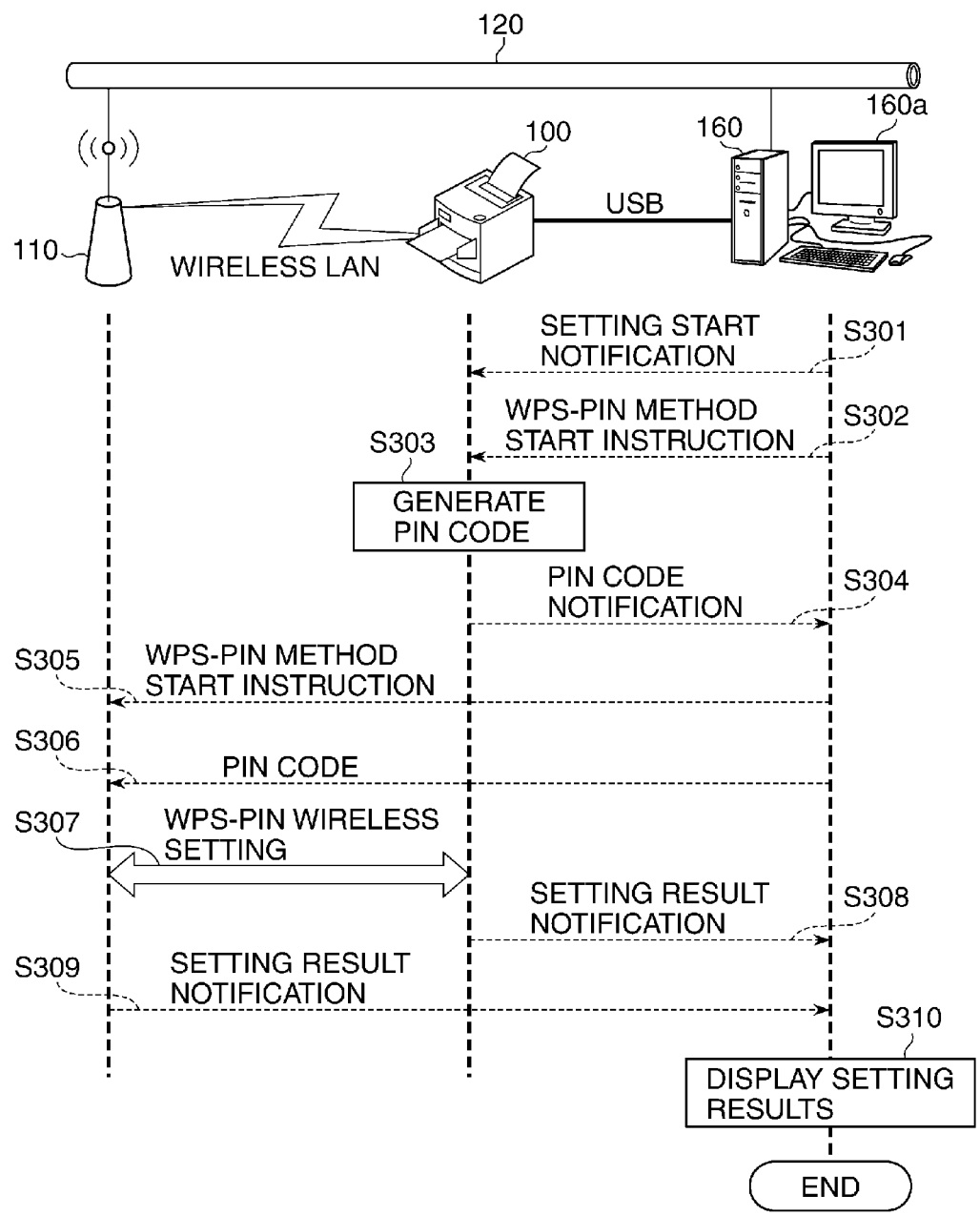
FIG. 3 is a view showing a second example of procedures of wireless communication setting control performed by the PC.

FIG. 3 shows a second example of procedures of wireless communication setting control in the wireless LAN system of FIG. 1. In this example, a case will be described where the PC 160 controls wireless communication setting in which the WPS-PIN method is used as the wireless communication setting function.

The wireless communication setting control of FIG. 3 is started when a predetermined application program for wireless communication setting is started by the PC 160. In the wireless communication setting control, the PC 160 sends a notification to start the wireless communication setting to the printer 100 via the USB interface (step S301), and instructs the printer 100 via the USB interface to start the WPS-PIN method (step S302).

When receiving the instruction to start the WPS-PIN method, the printer 100 generates a PIN code, which is usually a character string that can be represented by a numeric value of 8 bytes (step S303), and notifies the PC 160 of the PIN code (step S304).

When receiving the PIN code, the PC 160 instructs the AP 110 via the wired LAN 120 to start the WPS-PIN method (step S305), and transfers the PIN code to the AP 110 (step S306).

The printer 100 and the AP 110 start executing the wireless communication setting by the WPS-PIN method, which will be referred to as the WPS-PIN wireless setting (step S307). Since processing for the WPS-PIN wireless setting between the AP 110 and the printer 100 is the same as that for ordinary WPS-PIN setting, a description thereof is omitted herein.

After executing the WPS-PIN wireless setting, the printer 100 sends to the PC 160 a setting result notification that represents a result of the execution of the WPS-PIN wireless setting (step S308). Similarly, after executing the WPS-PIN wireless setting, the AP 110 sends to the PC 160 a setting result notification that represents a result of the execution of the WPS-PIN wireless setting (step S309). The PC 160 causes the display unit 160a to display the results of the execution of the WPS-PIN wireless setting (wireless communication setting), which are respectively notified from the printer 100 and the AP 110 (step S310), whereupon the wireless communication setting control of FIG. 3 is completed.

FIG. 4 shows procedures of a recovery process performed upon occurrence of an error during execution of the wireless communication setting control of FIG. 2.

An error can occur in the wireless communication setting control of FIG. 2. For example, if the printer 100 is at a distance from the AP 110 or if a wall or the like is present between the printer 100 and the AP 110, the radio field intensity required for communication cannot be ensured and a communication failure occurs. As a result, an error occurs in the wireless communication setting in step S204 of FIG. 2.

In that case, in the recovery process, a notification representing that the wireless communication setting has failed is sent from each of the AP 110 and the printer 100 to the PC 160 (step S401). In FIG. 4, there is only shown the setting failure notification sent from the printer 100. When receiving the setting failure notifications and determining that the wireless communication setting has failed, the PC 160 (parameter requesting unit) requests the AP 110, via the wired LAN 120, to transmit wireless LAN setting parameters (step S402).

In response to the transmission request, the AP 110 transmits the wireless LAN setting parameters to the PC 160 via the wired LAN 120 (step S403). The PC 160 (recovery control unit) analyzes the wireless LAN setting parameters, and instructs the printer 100 via the USB interface to execute the wireless communication setting based on the wireless LAN setting parameters (step S404).

Based on the wireless LAN setting parameters transmitted from the PC 160, the printer 100 executes the wireless communication setting (step S405). Then, the printer 100 sends a setting result notification representing a result of execution of the wireless communication setting to the PC 160 (step S406).

The PC 160 (display control/status information requesting unit) causes the display unit 160a to display the result of execution of the wireless communication setting notified from the printer 100 (step S407), and requests the printer 100 to transmit wireless communication status information (step S408).

As a result of the wireless communication setting performed in step S405 by the printer 100 on the basis of the wireless LAN setting parameters, the printer 100 has a wireless communication status corresponding to the wireless communication setting, and wireless communication status information that represents the wireless communication setting (i.e., various information such as radio field intensity for wireless communication and a list of APs) is stored in the printer 100. In response to the request from the PC 160 for transmission of wireless communication status information, the printer 100 acquires the wireless communication status information stored in the printer 100 and transmits the acquired information to the PC 160 (step S409). The PC 160 (display control unit) causes the display unit 160a to display the wireless communication status information received from the printer 100 (step S410), whereupon the recovery process is completed.

It should be noted that if the wireless LAN setting parameters transmitted from the AP 110 to the PC 160 in step S403 do not comply with the printer 100, the wireless communication setting in step S405 based on the wireless LAN setting parameters is canceled.

FIG. 5 shows procedures of a recovery process performed upon occurrence of an error during execution of wireless communication setting control by the PC 150.

It should be noted that the wireless communication setting control performed by the PC 150 is basically the same as that performed by the PC 160 as described in FIG. 2, but is different in that the PC 150 communicates with the AP 110 via wireless LAN, whereas the PC 160 communicates with the AP 110 via the wired LAN 120.

In the wireless communication setting control by the PC 150, wireless communication setting, which corresponds to the wireless communication setting in step S204 of FIG. 2, is performed. During execution of the wireless communication setting, an error can occur. Upon occurrence of an error, a notification representing that the wireless communication setting has failed is sent from each of the AP 110 and the printer 100 to the PC 150 (step S501). In FIG. 5, there is only shown the setting failure notification from the printer 100.

When receiving the setting failure notifications and determining that the wireless communication setting has failed, the PC 150 detects its wireless network interface (wireless LAN adapter) and acquires wireless LAN setting parameters from the wireless network interface (step S502).

Next, the PC 150 sends a notification to start wireless communication setting to the printer 100 via the USB interface (step S503), and transmits the wireless LAN setting parameters acquired in step S502 to the printer 100 (step S504).

Based on the wireless LAN setting parameters received from the PC 150, the printer 100 executes the wireless communication setting (step S505). Then, the printer 100 sends a setting result notification representing a result of execution of the wireless communication setting to the PC 150 (step S506). The PC 150 causes the display unit 150a to display the result of execution of the wireless communication setting notified from the printer 100 (step S507). As a result of the wireless communication setting performed in step S505 based on the wireless LAN setting parameters received from the PC 150, the printer 100 has a wireless communication status corresponding to the wireless communication setting, and wireless communication status information that represents the wireless communication setting is stored in the printer 100.

The PC 150 requests the printer 100 to transmit the wireless communication status information (step S508). In response to this request, the printer 100 acquires the wireless communication status information stored in the printer 100 and transmits the acquired information to the PC 150 (step S509). The PC 150 causes the display unit 150a to display the wireless communication status information (step S510), whereupon the recovery process is completed.

In the example shown in FIG. 5, if notifications each representing that an error has caused are received in step S501 by the PC 150 during execution of the wireless communication setting, no subsequent communication is performed between the PC 150 and the AP 110, and the recovery process is carried out.

Since the wireless communication setting control is performed by the PC 150 in the above manner, optimum wireless communication can easily be carried out.

As described above, according to the present embodiment, since the printer 100 and the AP 110 execute the wireless communication setting under the control of the PC 150 or 160 that operates according to a predetermined application program, the user is capable of extremely easily performing the wireless communication setting by simply starting the application program on the PC 150 or 160. In addition, it is unnecessary to provide the printer 100 with an additional device such as an input device for wireless communication setting, whereby increase in costs can be avoided.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-191614, filed Sep. 2, 2011, which is hereby incorporated by reference herein in its entirety.

What is claimed is:

1. A control apparatus that is connected via a wired network to an information processing apparatus having a wireless communication function and that controls a setting of wireless communication between a wireless access point and the information processing apparatus, comprising:
    a display unit;
    a setting control unit configured to instruct the information processing apparatus via the wired network to start the setting of wireless communication and instruct the wireless access point via a network to start the setting of wireless communication;
    a display control unit configured, when receiving a setting result notification that represents a result of execution of the setting of wireless communication between the information processing apparatus and the wireless access point, to cause said display unit to display the setting result notification;
    a requesting unit configured, when receiving from at least one of the wireless access point and the information processing apparatus a notification representing that the setting of wireless communication has failed, to request the wireless access point to transmit parameters required for the setting of wireless communication; and
    a recovery control unit configured, when receiving the parameters from the wireless access point, to instruct the information processing apparatus to perform the setting of wireless communication based on the parameters.

2. The control apparatus according to claim 1, wherein the network is a wired LAN or a wireless LAN.

3. The control apparatus according to claim 1, wherein said setting control unit and said display control unit operate in accordance with a predetermined application program.

4. The control apparatus according to claim 1, wherein the control apparatus is a PC that transmits print data via the wired network, and
    the information processing apparatus is an image forming apparatus that prints the print data.

5. The control apparatus according to claim 1, wherein when receiving a notification that represents a result of the setting of wireless communication performed based on the parameters, said display control unit causes said display unit to display the notification.

6. The control apparatus according to claim 1 further including:
    a status information requesting unit configured, when receiving from the information processing apparatus the notification that represents a result of the setting of wireless communication performed based on the parameters, to instruct the information processing apparatus to transmit information representing a wireless communication status obtained as a result of execution of the setting of wireless communication,
    wherein when receiving the information representing the wireless communication status from the information processing apparatus, said display control unit causes said display unit to display the information representing the wireless communication status.

7. A control method for a control apparatus that is connected via a wired network to an information processing apparatus having a wireless communication function and that controls a setting of wireless communication between a wireless access point and the information processing apparatus, comprising:
    a setting control step of instructing the information processing apparatus via the wired network to start the setting of wireless communication and instructing the wireless access point via a network to start the setting of wireless communication;
    a display control step, when receiving a setting result notification that represents a result of execution of the setting of wireless communication between the information processing apparatus and the wireless access point which is performed in response to instructions given in said setting control step, of causing a display unit of the control apparatus to display the setting result notification;
    a requesting step, when receiving from at least one of the wireless access point and the information processing apparatus a notification representing that the setting of wireless communication has failed, to request the wireless access point to transmit parameters required for the setting of wireless communication; and
    a recovery step, when receiving the parameters from the wireless access point, to instruct the information processing apparatus to perform the setting of wireless communication based on the parameters.

8. A non-transitory computer-readable storage medium storing a computer program for causing a computer to execute a control method for a control apparatus that is connected via a wired network to an information processing apparatus having a wireless communication function and that controls a setting of wireless communication between a wireless access point and the information processing apparatus, comprising:
    a setting control step of instructing the information processing apparatus via the wired network to start the setting of wireless communication and instructing the wireless access point via a network to start the setting of wireless communication;
    a display control step, when receiving a setting result notification that represents a result of execution of the setting of wireless communication between the information processing apparatus and the wireless access point which is performed in response to instructions given in said setting control step, of causing a display unit of the control apparatus to display the setting result notification;
    a requesting step, when receiving from at least one of the wireless access point and the information processing apparatus a notification representing that the setting of wireless communication has failed, to request the wireless access point to transmit parameters required for the setting of wireless communication; and a recovery step, when receiving the parameters from the wireless access point, to instruct the information processing apparatus to perform the setting of wireless communication based on the parameters.

\* \* \* \* \*